United States Patent [19]

Yamashita et al.

[11] Patent Number: 5,708,909
[45] Date of Patent: Jan. 13, 1998

[54] EQUIPMENT MANAGEMENT SYSTEM

[75] Inventors: Yuji Yamashita; Jiro Nagira; Yasuhiro Hashimoto; Hiroshige Utatsu, all of Osaka, Japan

[73] Assignee: Mita Industrial Co., Ltd., Osaka, Japan

[21] Appl. No.: 697,891

[22] Filed: Sep. 3, 1996

[30] Foreign Application Priority Data

Sep. 12, 1995 [JP] Japan ..................................... 7-233621

[51] Int. Cl.⁶ .................................................. G03G 15/00
[52] U.S. Cl. ........................... 399/8; 399/9; 399/10; 399/12
[58] Field of Search ..................... 399/8, 9, 10, 11, 399/12

[56] References Cited

U.S. PATENT DOCUMENTS

| | | | |
|---|---|---|---|
| 5,077,582 | 12/1991 | Kravette et al. | 399/8 |
| 5,184,179 | 2/1993 | Tarr et al. | 399/8 |
| 5,282,127 | 1/1994 | Mii | 364/130 |
| 5,394,458 | 2/1995 | Allen et al. | 379/1 |

*Primary Examiner*—Matthew S. Smith
*Attorney, Agent, or Firm*—Beveridge, DeGrandi, Weilacher & Young,LLP

[57] ABSTRACT

In a management system in which electronic photocopiers are linked through a network with a host computer at a maintenance company that manages the photocopiers and with another host computer at a lease company that performs charging and other tasks related to the use of the photocopiers, registration to the latter host computer and setting thereupon of transmission times of periodical reports can be performed without any inconvenience. Data including the ID number of a copier and the code of the maintenance company are transmitted from a communications control device provided in the copier to the host computer of the lease company. This host computer, when the received ID number and code have not been registered, puts the ID number and code on a list of unregistered copiers, and makes the device transmit data every day until the copier is registered. When the copier is registered, the host computer erases the ID number of the copier and the code of the maintenance company from the list of unregistered copiers. Thus, the lease company's failure to register a copier can be readily detected, so that a lease contract can be fulfilled without delay.

5 Claims, 9 Drawing Sheets

List of Unregistered Copiers

| Date | Time | ID | code | Maintenance Company Name | Registration Status |
|---|---|---|---|---|---|
| 95-05-25 | 02:12 | 125 | WXYZ | ABC Technical Service Co. | Unregistered |

EQUIPMENT MANAGEMENT SYSTEM

BACKGROUND OF THE INVENTION

1. Field of the Invention

The present invention relates to an improvement on an equipment management system for systematically performing data communication and managing a network, such as a system for managing communications between electronic photocopiers installed as terminal devices, a host computer installed at a maintenance company that manage those photocopiers, and another host computer installed at a lease company that performs charging and other tasks related to the use of the photocopiers.

2. Description of the Prior Art

For example, an electronic photocopier requires supplies of toner and paper as well as various kinds of maintenance work to maintain proper copying functions. A user of such a copier, therefore, usually signs a contract with a maintenance company for long-term management of the copier in various aspects of maintenance. A business-use copier is usually leased to a user for a definite period based on a lease contract closed between the user and a lease company.

Because of the relations as described above between the user of a copier, the maintenance company, and the lease company, the maintenance and lease companies are necessitated to manage a large number of copiers. In fact, such companies have already started using a copier management system, as one practical example of an equipment management system, in order to collectively manage all the copiers in terms of, for example, machine condition, copy count, paper-jam history, maintenance data, parts procurement, and others per each copier.

In general, in this type of copier management system, data concerning users' copiers, such as the copy counts as mentioned above, are collectively managed through a telephone line; thus a plurality of maintenance companies manage a large number of copiers, whereas a lease company is under contract with a considerable number of maintenance companies through copiers. Each copier is equipped with a communications control device that serves as a terminal device. At each maintenance company is installed a first host computer, and at the lease company is installed a second host computer. These devices and host computers are each equipped with a modem for communication so as to be connected to one another via telephone lines.

The host computer at the lease company is used for requesting payment of copy charges, and therefore it receives only limited data, such as the copy counts, from the communications control device attached to the copier. On the other hand, the host computer at the maintenance company not only receives all data, including data for calling a serviceperson, concerning the copier from the device beside the copier, but also sets data on that device; for example, it sets the phone number of the lease company's host computer, the time at which regular periodical dialing is performed, the copy count permitted under contract, and others. Based on these settings, the communications control device of each copier communicates with the host computers at the maintenance and lease companies, so that all the copiers are managed collectively.

In the above described conventional management system, data such as model names of the copiers, user addresses or installation locations, and copy counts permitted under contract are registered beforehand in the host computer at the maintenance company. For actual communication, an ID (identification) number is allocated to each copier, so that each copier is identified by its ID number, not by its model name.

According to this system, when a copier is newly installed at a user's site, first, the data concerning the user and other data such as the model name of the copier are registered in the host computer at the maintenance company with which the user is under contract, so that the device is initialized. At the same time, the phone number for transmission to the host computer at the lease company with which the user is under contract is registered in the device. Next, the host computer at the maintenance company communicates with the communications control device of the copier, and sets an ID number on it to enable the copier to communicate.

Moreover, as the data concerning the copier to which an ID has been allocated, necessary part of the data registered in the host computer of the maintenance company need to be entered and registered also in the host computer of the lease company. However, the host computers of the maintenance and lease companies are not always connected to each other. Therefore, unless the data concerning the copier has not been registered in the lease company's host computer in advance, communication is not established because of an error that occurs, for example, during confirmation of the ID number in the communication establishing procedure.

For this reason, it is customary that, when the device is initialized, the data concerning the copier is registered first at the maintenance company and the registered data is then transferred to the lease company orally by telephone or in writing by facsimile, so that the data transferred from the maintenance company (data concerning the copier) is registered in advance in the host computer at the lease company. Once the data concerning the copier is registered in both host computers at maintenance and lease companies in this way, the communications control device of the copier periodically communicates with the host computers of the maintenance and lease companies, in order to transmit data required by each host computer.

Incidentally, in a copier management system in which the communication control device originates a call so that data concerning the copier is collected, it is essential that the host computers of the maintenance and lease companies can smoothly receive data at any time. To achieve this, different transmission times need to be allocated to different devices in advance, in order to prevent conflict of transmission times among the devices under contract. In the case where transmission times are allocated by the host computer at the maintenance company, the system itself automatically allocates transmission times in such a way that conflict of transmission times will not occur. Nevertheless, in the situation where the lease company is involved, if transmission for the lease company is performed according to the times that are automatically allocated by the system on the host computer of each maintenance company, as many transmissions as the number of the maintenance companies conflict with one another.

Since transmission times are unavoidably allocated for the convenience of the maintenance company, for example, 12:00 for the copier that was the first registered in the maintenance company's host computer, and 12:30 for the second copier, etc., these transmission times conflict with the transmission times that another maintenance company allocates in its own way according to a similar method. To circumvent such inconvenience, in the situation where the lease company is involved, the transmission time of a periodical report from the device need to be allocated not by the maintenance company but by the lease company.

Moreover, as important as avoiding conflict of transmission times is allocation of transmission dates. Allocation of transmission dates is also conducted at the time of device initialization, conventionally by the maintenance company. However, in the situation where the lease company is involved, since the date at which the copy count is read depends on a lease contract, it is naturally more convenient that the lease company allocates the transmission dates.

Allocation of the transmission dates by the lease company work well, as long as the lease company notifies the maintenance company of the transmission dates in advance. However, if the contract with the lease company is made later than the contract with the maintenance company, for example, it sometimes happens that setting of a transmission time is impossible at the date allocated by the lease company. This is because the lease company's host computer can handle only a limited number of transmission time setting sessions per day, and, even if setting of a transmission time is tried again, it may again result in an error. For this reason, transmission dates and transmission times are usually allocated by the lease company, well after initialization of the device.

Note that, in this type of management system, communication from the lease company's host computer to each device is inhibited. This is because it is practically impossible to occupy a telephone line all the time exclusively for a communications control device of the copier. Usually, a telephone line for a facsimile machine or telephone set is let to pass circuitously through the device, and the device is set for transmission only, so that, when a call is received through the telephone line, the device does not answer the call but transfer it to the facsimile machine or telephone set. Accordingly, it is customary that, if the lease company receives transmission from more than one devices at a time, new transmission times are allocated to those devices.

In the above described conventional management system, however, until the lease company completes registration of the data of a copier that is transferred by facsimile or other from the maintenance company, the lease company cannot receive data from the device of that copier. For example, reception is impossible when the maintenance company has failed to notify the lease company of the copier data or delayed in doing so, or when the lease company failed to register the copier data in its host computer. Moreover, once data fails to be received, it is never known to the user, nor to the maintenance or lease company. Thus, even if the device is properly set up, communication may fail, making requesting of copy charges impossible.

Moreover, since a transmission date needs to be allocated in accordance with the date for issuing a bill, the communications control device of each copier usually communicates once a month conventionally. Therefore, when a transmission date is reallocated, it is necessary, as a rule, to wait until the transmission date of the next month. This means that reallocation of a transmission time requires a fairly long period. Thus, it is impossible to read the count in compliance with the contract. Further, in this case, it is difficult to confirm whether the lease company has already fixed a transmission date or not, and it is impossible to confirm whether the transmission date fixed by the lease company has already been set on the device or not.

SUMMARY OF THE INVENTION

An object of the present invention is to make it possible, in a management system in which electronic photocopiers are linked through a network with a host computer at a maintenance company that manages the photocopiers, and with another host computer at a lease company that performs charging and other tasks related to the use of the photocopiers, to perform registration to the latter host computer and setting thereupon of transmission times of periodical reports without any inconvenience.

The present invention is applicable to an equipment management system comprising terminal devices attached to managed pieces of equipment for transmitting equipment management data with which those pieces of equipment are managed; a first host computer linked with one group of terminal devices through a communications network for collectively managing that one group of terminal devices in terms of specific items of management data; and a second host computer linked with another group of terminal devices including at least part of the one group of terminal devices for collectively managing that other group of terminal devices in terms of other items than the specific items of management data; wherein the terminal devices, the first host computer, and the second host computer are linked through a network.

The first host computer sets initial data including a symbol for identifying the managed piece of equipment on each terminal device, and, out of those initial data, a necessary data including the symbol is registered in the second host computer, so that the second host computer can cope with any of the terminal device. To achieve the above-mentioned object, according to the present invention, the second host computer is equipped with a managed equipment list display means, and a instruction signal generating means.

Specifically, the managed equipment list display means, on receiving transmission from a terminal device while an item concerning a piece of equipment corresponding to that terminal device has not been processed in the second host computer, displays the symbol transmitted from the terminal device on a managed equipment list together with an indication indicating lack of the item, and, when the item has been processed, changes the indication indicating lack of the item to an indication indicating completion of processing of the item. The instruction signal generating means instructs the terminal device of the piece of equipment appearing on the list displayed on the managed equipment list display means to keep transmitting periodically until the item concerning the piece of equipment is processed, by transmitting an instruction signal to that terminal device during data reception from the terminal device.

In a construction that performs a registration procedure on another transmission destination, the item concerning the managed equipment is a necessary data that is to be registered in the second host computer. Here, the managed equipment list display means, on receiving transmission from the terminal device while the necessary data concerning the managed piece of equipment corresponding to that terminal device has not been registered in the second host computer, displays the symbol transmitted from the terminal device on the managed equipment list together with an indication indicating non-registration, and, when the necessary data has been registered in the second host computer, changes the indication indicating non-registration to an indication indicating completion of registration. The instruction signal generating means instructs the terminal device of the piece of equipment appearing on the list displayed on the managed equipment list display means to keep transmitting periodically until the necessary data concerning the piece of equipment is registered, by transmitting an instruction signal to that terminal device during data reception from the terminal device.

According to the above construction, even if the office at which the second host computer is installed fails to register a managed piece of equipment, for example, it can easily be detected. Therefore, if the office belongs to the company that is leasing the managed piece of equipment, for example, it is possible to request the company to fulfill the lease contract without delay.

Moreover, the managed equipment list display means may be so constructed that, after answering a call from a terminal device of a managed piece of equipment whose item has been processed, it erases data of that managed piece of equipment from the managed equipment list. According to this construction, after a call from a terminal device of a managed piece of equipment whose item has been processed has been answered, data of that managed piece of equipment is erased from the managed equipment list. Therefore, constant attention needs to be paid only to pieces of equipment whose item has not been processed.

In a construction that fixes transmission times for periodical reports, the item concerning the managed equipment is a communication date that is to be fixed by the second host computer. Here, the managed equipment list display means, on receiving transmission from the terminal device while the communication date for that terminal device has not been fixed, displays the symbol transmitted from the terminal device on the managed equipment list together with an indication indicating unfixedness of the communication date, and, when the communication date has been fixed, changes the indication indicating unfixedness of the communication date to an indication indicating fixedness of the communication date. The instruction signal generating means instructs the terminal device of the piece of equipment appearing on the list displayed on the managed equipment list display means to keep transmitting periodically until the communication date for the piece of equipment is fixed, by transmitting an instruction signal to that terminal device during data reception from the terminal device. According to this construction, the communication date can be fixed without fail. Moreover, the communication date can be fixed in a shortest time.

In the above described construction, if terminal devices are attached to electronic photocopiers, they are useful for transmitting data concerning how the electronic photocopier is used.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
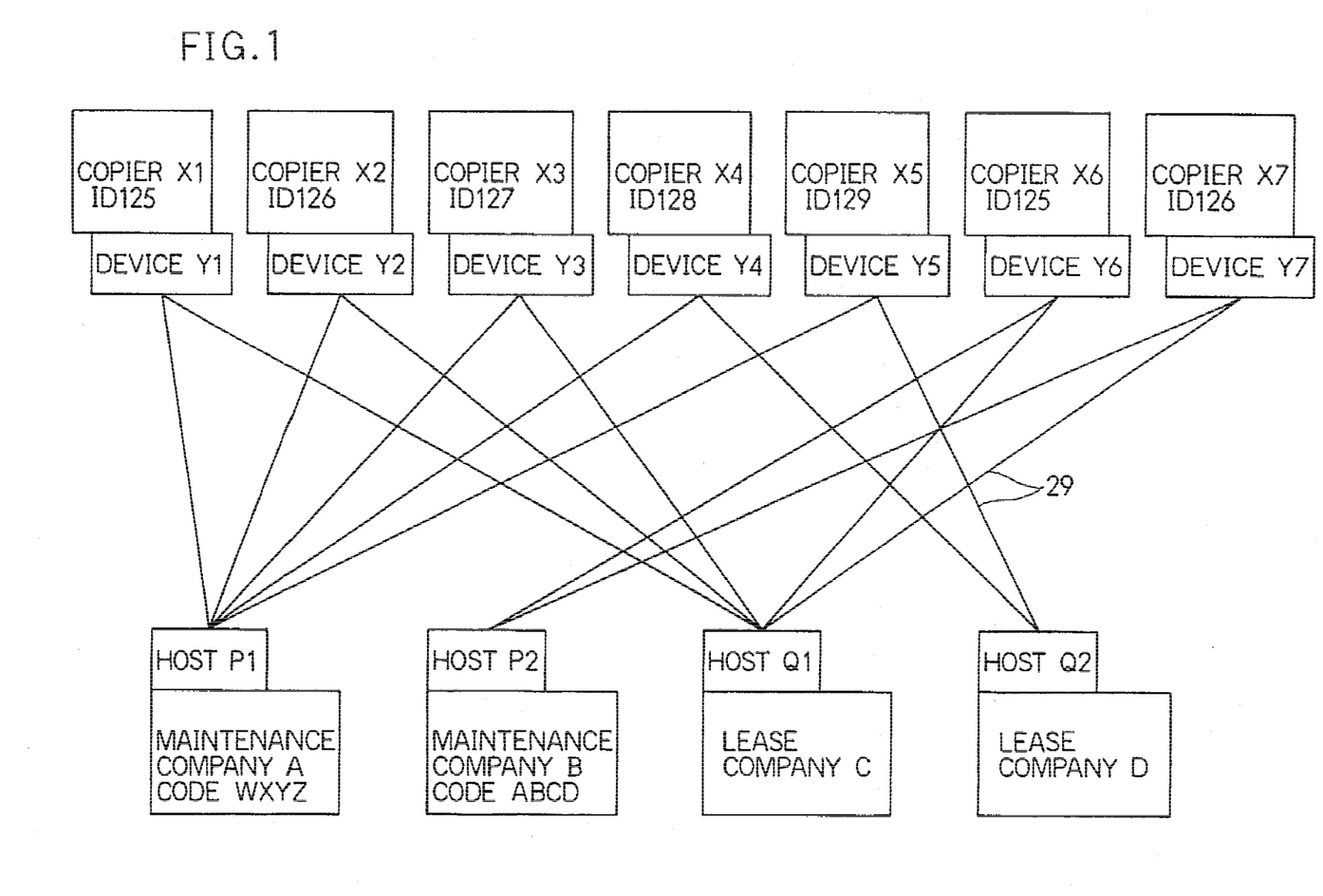
FIG. 1 is a block diagram showing the outline of a management system embodying the present invention.

Hereinafter, an embodiment in which the present invention is applied to a management system for copiers will be described with reference to the drawings. FIG. 1 schematically shows an example of the copier management system. In this figure, the copiers X1 to X7 are each equipped with a communications control device Y1 to Y7 that serves as a terminal device. At maintenance companies A and B, host computers P1 and P2 are installed, each serving as a first host computer. At lease companies C and D, host computers Q1 and Q2 are installed, each serving as a second host computer. The devices Y1 to Y7 and the host computers P1, P2, Q1, and Q2 are, as described later, each equipped with a modem for communication, so as to be connected to one another through telephone lines. The devices Y1 to Y7 are also referred to as copier management devices in the following description.

For simplicity's sake, the management system shown in the figure assumes that there are seven copiers, and two maintenance companies and two lease companies that take care of those copiers. In reality, however, a far larger number of copiers are managed by a plurality of maintenance companies, and the lease companies are under contract with a considerable number of maintenance companies.

Figure 2:
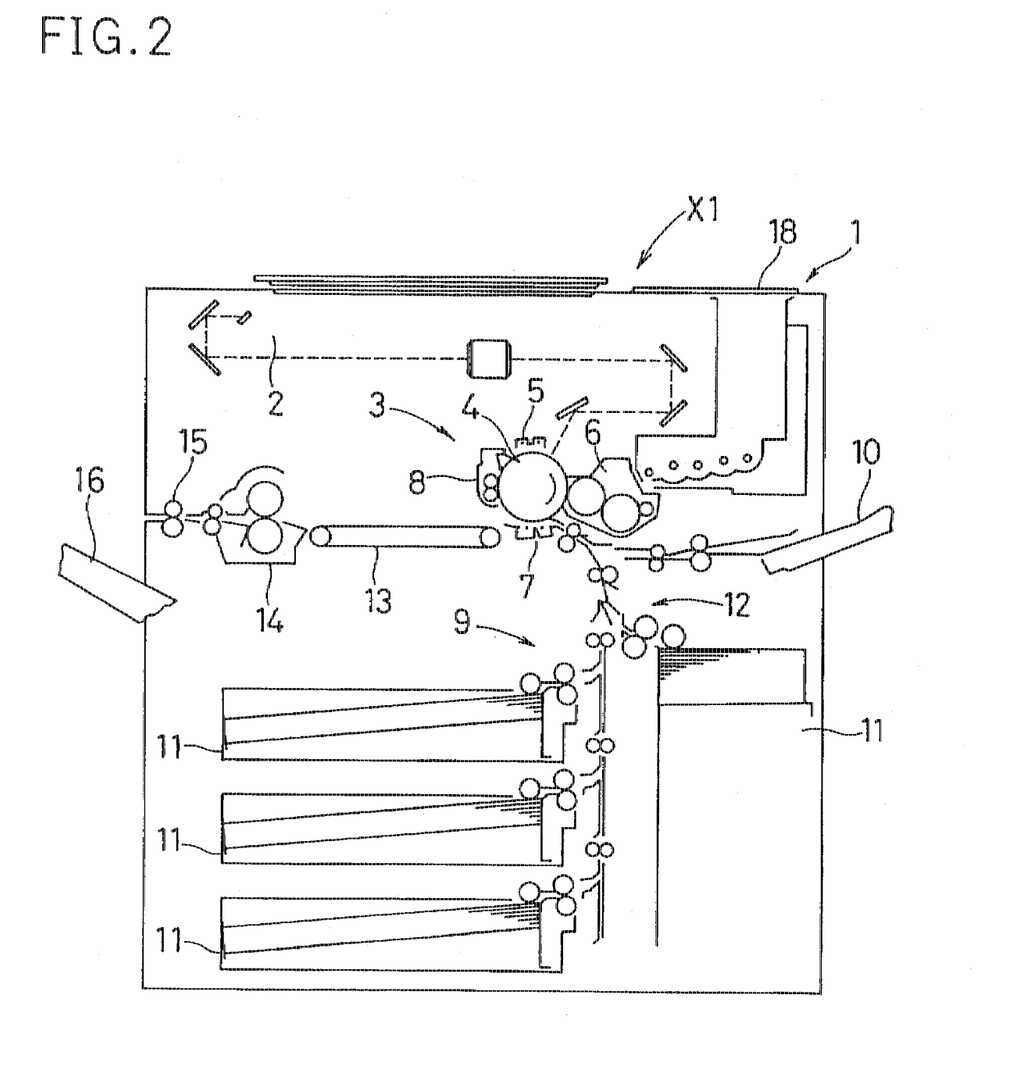
FIG. 2 is a cross-sectional view schematically showing a copier.

First, a description will be given as to the electronic photocopier X1 as representing the copiers. As shown in FIG. 2, the copier X1 is provided with a copier body 1 and an optical system 2 fitted in the upper part of the body 1; the optical system 2 for reading an original comprises a light source, mirrors, lens units, and other components. In the central part of the copier body 1 is provided an image forming section 3 for forming an image with toner based on the read original. The image forming section 3 has a photosensitive drum 4 on the surface of which an electrostatic latent image is formed. Arranged around the photosensitive drum 4 are a main charger 5, a developing unit 6, a separation charger 7, and a cleaning unit 8.

In the lower part of the copier body 1 is provided a paper feed unit 9. The paper feed unit 9 comprises a bypass table 10 that is disposed in the upper right-hand part of the copier body 1 shown in FIG. 2, a plurality of paper feed cassettes 11 arranged vertically in the lower part of the copier body 1, and a paper transfer unit 12 for transferring paper sheets stocked in the bypass table 10 or paper feed cassettes 11 to the image forming section 3. Arranged on the downstream side of the image forming section 3 along the paper transfer direction are a paper ejecting conveyor 13 for conveying paper sheets to the upper left-hand part of the copier shown in FIG. 2, a fixing unit 14 for fixing a toner image on paper by fusion, ejecting rollers 15 for ejecting paper sheets after image fixation, and a ejected-paper tray 16 for stocking ejected paper sheets.

Figure 3:
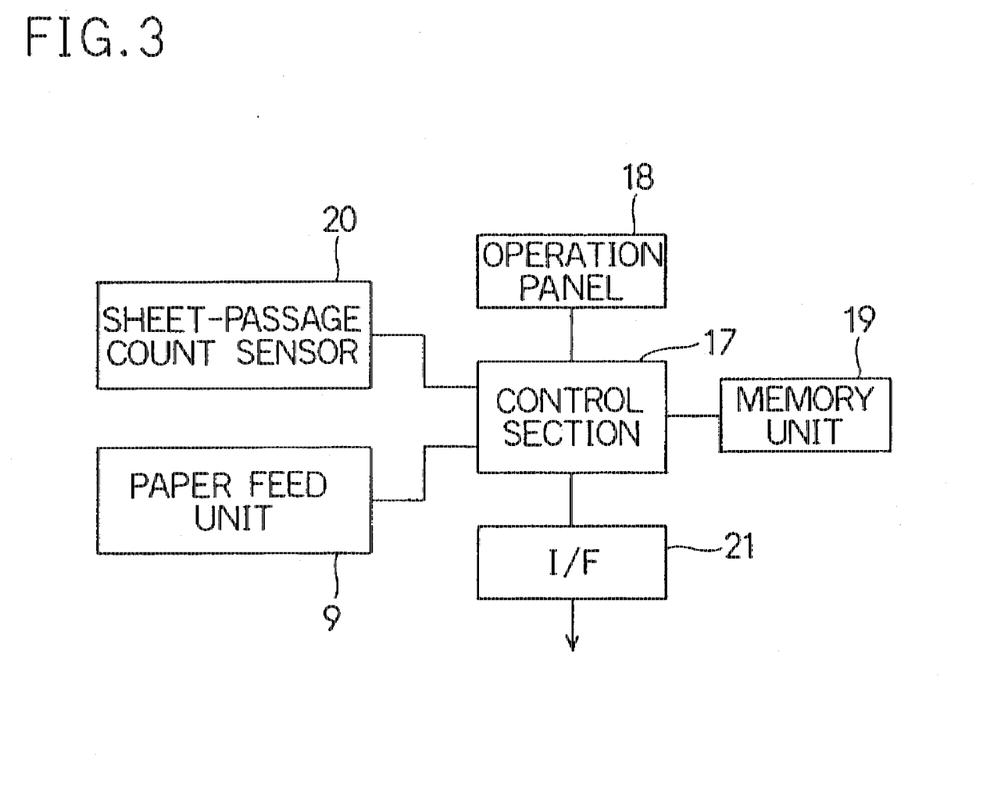
FIG. 3 is a block diagram showing the control system of the copier.

The copier body 1 is further equipped with a control section 17 shown in FIG. 3. The control section 17 is constructed as a microcomputer system including a CPU, a RAM, a ROM, a variety of drivers, and a variety of I/O ports, and an operation panel 18 is connected to it. As shown in FIG. 2, the operation panel 18 is disposed on the upper surface of the copier body 1, and includes an input keypad unit and a display unit composed of liquid crystal display devices or light 15 emitting diodes.

To the control section 17, a memory unit 19 for storing a variety of operation data is also connected. The memory unit 19 stores, for example, the total count of copies produced by the copier body 1. Also connected to the control section 17 are a sheet-passage count sensor 20 for counting how many images have been formed, and a paper feed unit 9 for feeding paper from paper feed cassettes 11. Actually, a plurality of sheet-passage count sensors 20 are arranged in appropriate positions along the paper feed path from each paper feed cassette 11 through the image forming section 3 and the fixing unit 14 to the ejected-paper tray 16, so that, when a correct passage of a paper sheet is detected, the total count stored in the memory unit 19 is incremented.

Furthermore, the control section 17 is connected through an interface 21 to the copier management device Y1, so that the copy count counted by the sheet-passage count sensor 20 is transmitted to that device Y1.

Figure 4:
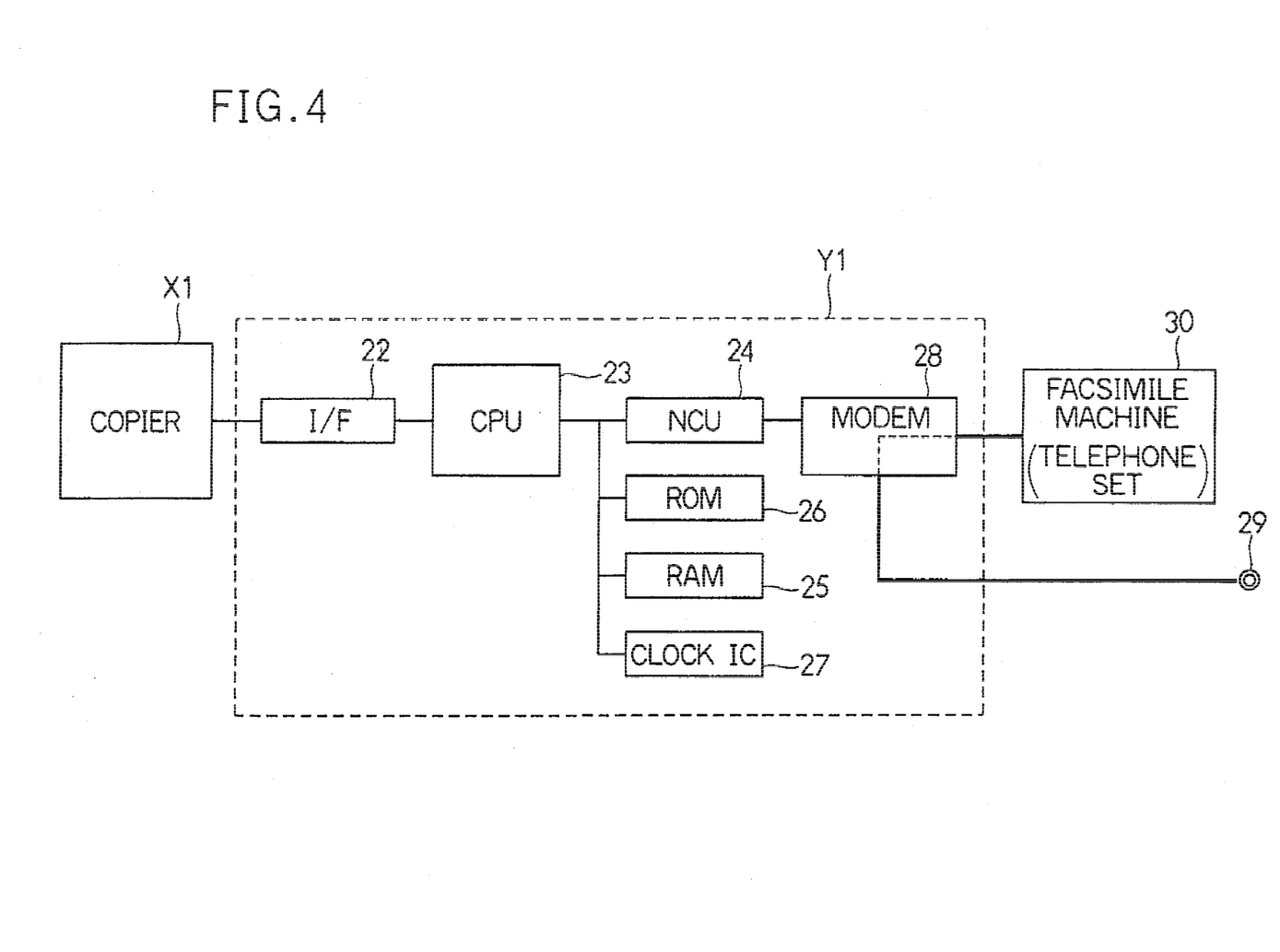
FIG. 4 is a block diagram showing the construction of the communications control device.

The copier management device Y1, which serves to transmit data required for managing the copier X1, is, as shown in FIG. 4, equipped with a serial interface 22, which is connected to the copier body 1. The serial interface 22 is connected to a CPU 23. The CPU 23 is formed as a so-called microcomputer system, and is connected to an NCU (network control unit) 24, a RAM 25, a ROM 26, and a clock IC 27. The NCU 24 is connected to a modem 28, and the modem 28 is in turn connected to a telephone line 29.

Note, however, that it is not practical to use the telephone line 29 exclusively for the communications control device Y1 of the copier. In reality, a telephone line for a facsimile machine (or telephone set) 30 is let to pass circuitously through the device Y1, and the device Y1 is set for transmission only, so that, when a call is received through the telephone line, the device Y1 does not answer the call but transfer it to the facsimile machine or telephone set. Accordingly, in the management system of this embodiment, the host computers P1 and P2 at the maintenance companies A and B can originate a call to the devices Y1 to Y7 only when they initialize the devices, and they are not allowed to do so again thereafter.

Figure 5:
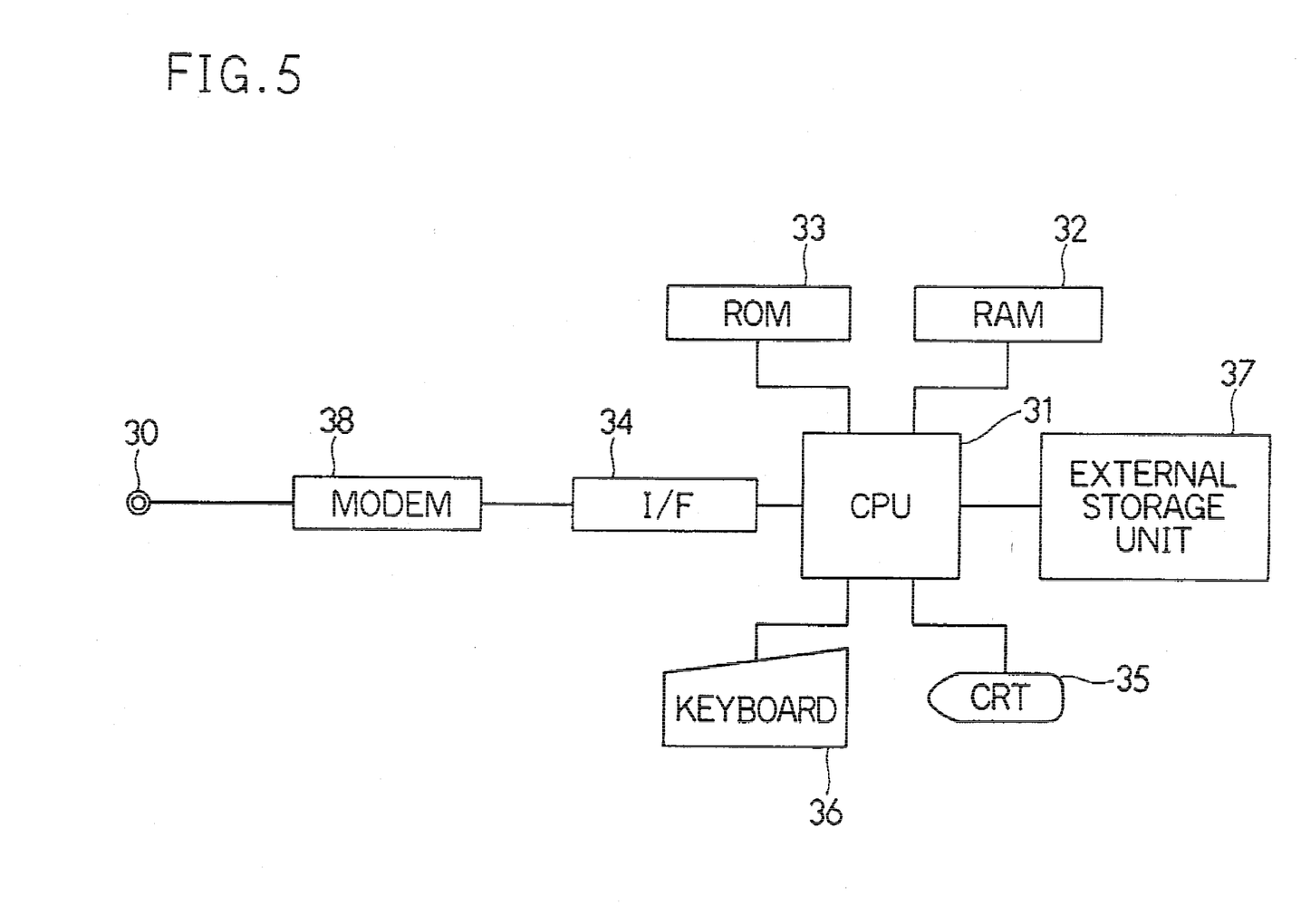
FIG. 5 is a block diagram showing the construction of the host computer.

Next, a description will be given below as to the host computer P1 at the maintenance company A as representing the host computers. As shown in FIG. 5, the host computer P1 is provided with a CPU 31, a RAM 32 and a ROM 33 that are connected to the CPU 31, and an input/output interface 34. Furthermore, a CRT 35 for display, a keyboard 36 for data entry, an external storage unit 37, and others are connected to the CPU 31. The input/output interface 34 is provided with an input/output terminals such as RS-232C, and is connected through a communications modem 38 to a commercial telephone line.

As to the other copiers X2 to X7, devices Y2 to Y7, and host computers P2, Q1, and Q2 at the maintenance company B and the lease companies C and D, no description will be given because they have similar constructions to the copier X1, the device Y1, and the host computer P1, respectively.

In the management system shown in FIG. 1, the maintenance company A manages the copiers X1 to X5, and the maintenance company B manages the copiers X6 and X7. On the other hand, the lease company C is leasing the copiers X1, X2, X3, X6, and X7 to different users, and the lease company D is leasing the copiers X4 and X5 to other different users.

The host computers P1 and P2 at the maintenance companies not only receive all kinds of data concerning the copiers X1 to X7 from the devices Y1 to Y7, including data for serviceperson calls, but also set various data of the copiers on the devices, for example, the phone number of the host computer Q1 or Q2 at the lease company C or D, the time for regular periodical dialing, and the copy count permitted under contract. Note, however, that this setting process is performed exclusively when a device is initialized, and is not allowed thereafter.

On the other hand, the host computers Q1 and Q2 at the lease companies C and D are used for requesting payment of copy charges, and accordingly they receive only limited kinds of data, such as the copy counts, from the communications control devices Y1 to Y7 of the copiers X1 to X7. Based on the above described settings, the communications control devices Y1 to Y7 of the copiers X1 to X7 communicate with the host computers P1, P2, Q1, and Q2 at the maintenance and lease companies A, B, C, and D in order to collectively manage the copiers X1 to X7.

In the above described management system, data such as model names of the copiers X1 to X7, user addresses or installation sites, copy counts as permitted under contract are registered in the host computers P1 and P2 at the maintenance companies. For actual communication, an ID number is allocated to each copier, so that the copiers can be managed by their ID numbers, without using their model names.

How the ID number is allocated is as follows. The host computer P1 at the maintenance company A, for example, first registers an ID number in itself, and then transmits the ID number to, for example, the communications control device Y1 of the copier X1. On receiving the ID number, the device Y1 replies to the host computer P1 to notify it of completion of ID number allocation.

In this case, the lease company C manages data of the maintenance company A for the copiers X1 to X3, and manages data of the maintenance company B for the copiers X6 and X7. On the other hand, the lease company D manages data of the maintenance company A for the copiers X4 and X5. Thus, since the lease companies C and D each manage copier data of a plurality of maintenance companies A and B, when the host computers Q1 and Q2 receive device data, confusion is unavoidable in distinguishing between data managed by different maintenance companies if only the ID numbers of the copiers are referred to.

To eliminate such inconvenience, the lease companies allocate codes of maintenance companies, and the maintenance companies transmit their code, so that data, including maintenance company codes, concerning the maintenance companies are registered beforehand in the host computers Q1 and Q2 at the lease companies. In this way, even if the maintenance companies A and B allocate the same ID number "ID125", for example, to both copiers X1 and X6, but if the maintenance company A has a code "WXYZ" allocated to it and the maintenance company B has a code "ABCD" allocated to it, the copier X1 can be referred to as "ID125, code WXYZ" and the copier X6 as "ID125, code ABCD". Thus, even if each of the maintenance companies A and B allocates copier ID numbers according to its own principle, conflict of ID numbers is avoided without fail.

Next, in relation to the copier X1 and the communications control device Y1, a description will be given as to the maintenance company A and the lease company C as representatives. When the maintenance company A initializes the device Y1 as described earlier, the device Y1, at the specified time on the same day, transmits data to inform the lease company C that the initialization of the device Y1 of the copier X1 has been completed, and that operation under lease contract has been thus started. Incidentally, the device Y1 performs this transmission during night, when telephone lines are less busy in general.

Figure 6:
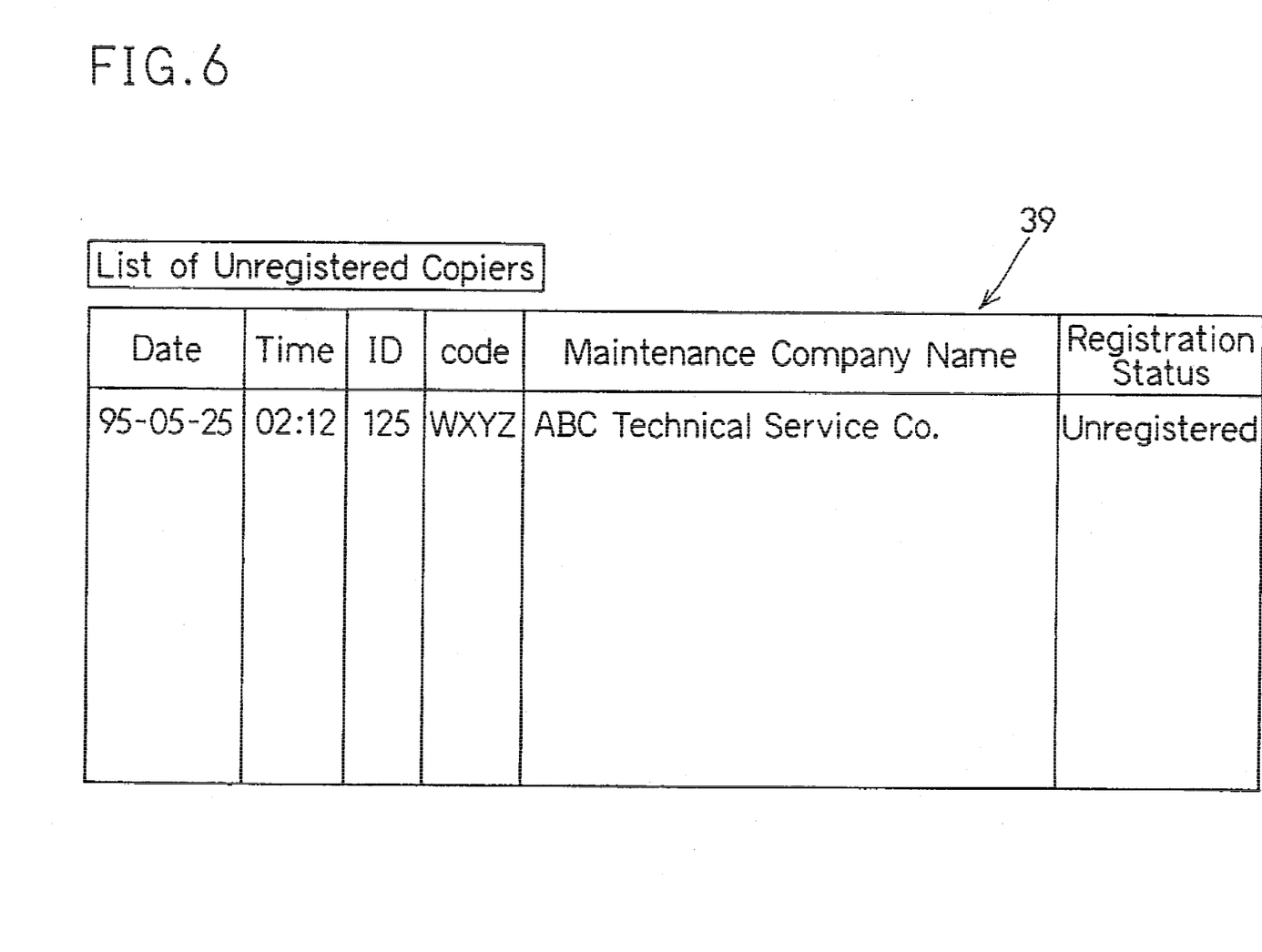
FIG. 6 is a diagram showing a list of unregistered copiers.
Figure 7:
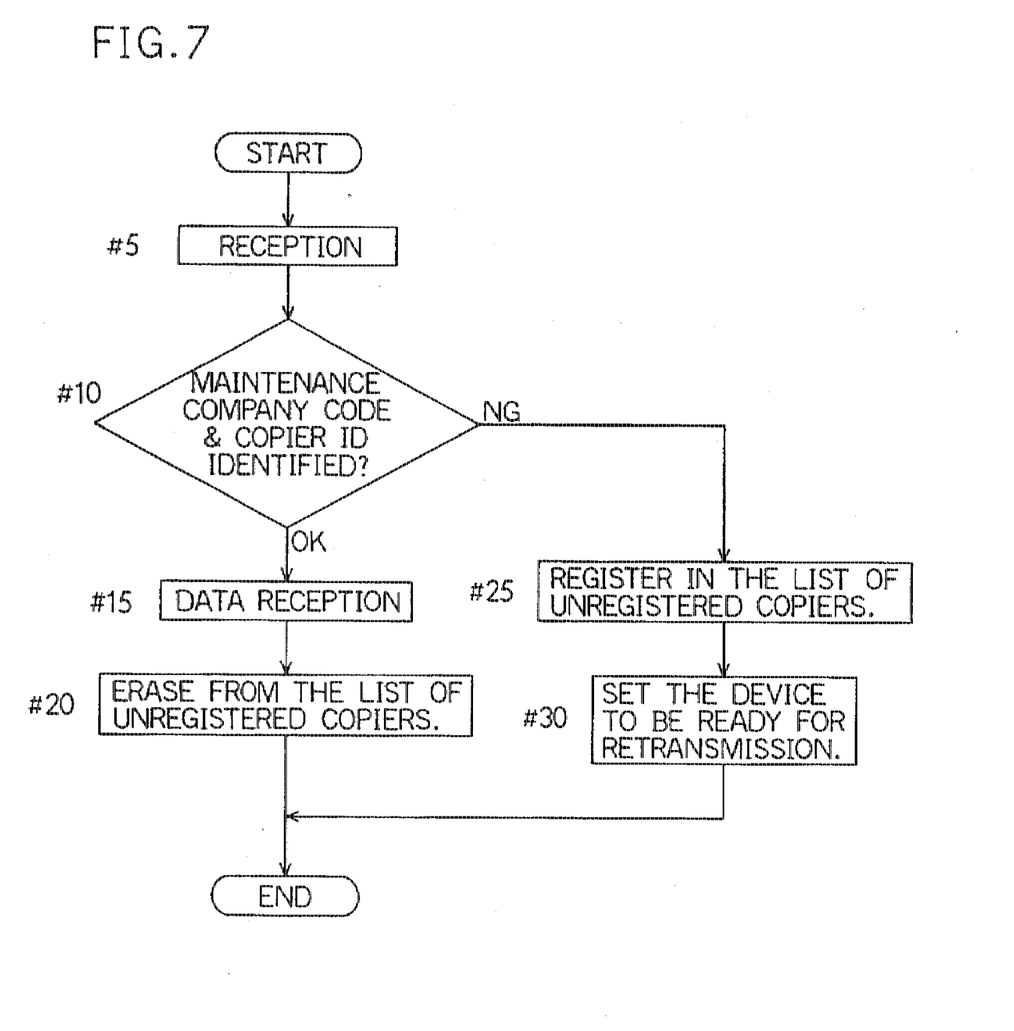
FIG. 7 is a flowchart showing a procedure for registering a copier on the host computer of the lease company.

FIG. 6 shows a list of unregistered copiers 39 in the host computer Q1 at the lease company C. FIG. 7 is a flowchart showing the operation of the CPU 31 in that host computer Q1. As shown in FIG. 7, when the CPU 31 receives through the modem 38 the ID number of the copier X1 and the code of the maintenance company A that have been transmitted from the device Y1, in step #5, the CPU 31 judges whether or not the received ID number and code have already been registered, in step #10.

If the received ID number is not identified, the CPU 31 judges that the copier X1 referred to by that ID number has not been registered; even then, however, the procedure proceeds to step #25 to receive data, so that, during reception, the ID number of the copier and the code of the maintenance company A are read, and are displayed together with the reception date, the reception time, and the maintenance company name, on the list of unregistered copiers 39 that serves as a managed equipment list display means, as shown in FIG. 6. Note that the list of unregistered copiers 39 is stored in the external storage unit 37.

Simultaneously, in step #30, the device Y1 is set to be ready for retransmission. The instruction for retransmission is issued during the communication with the device Y1, and the data for the instruction can be transmitted by operating, for example, extended AT commands of the modem 38. In order to set retransmission, the transmission date is rewritten so that transmission takes place at the specified time on the next day, or the flag for daily transmission is set to ON, for example. In this way, the device repeats transmission every day, until the copier X1 is registered in the host computer Q1.

When an unregistered copier is registered, the indication in the registration status column on the list of unregistered copier 39 shown in FIG. 6 automatically changes from "unregistered" to "registered", "yet to be processed", "under processing" or "processed", so that the registration of the copier X1 in the host computer Q1 is easily confirmed on the screen. Thereafter, when data is received from the device Y1, the normal data processing is performed in step #15, and then the entry as to the copier X1 is erased from the list of unregistered copiers 39 in step #20.

As described above, in this embodiment, the second host computer, on receiving transmission from a communications control device of a copier while necessary data concerning the copier corresponding to that device has not been registered in the second host computer, displays the ID number of the copier and the code of the maintenance company that have been transmitted from the device on a managed equipment list together with an indication indicating non-registration, and, until the data concerning the unregistered copier displayed on the list is registered in the second host computer, instructs the device of that copier to transmit periodically. In addition, the second host computer, when the data concerning that copier has been registered in the second host computer, changes the indication indicating non-registration to an indication indicating completion of registration. As a result, the lease company's failure to register a copier can be easily detected, and it is possible to request the company to fulfill the lease contract without delay.

Knowing that a copier is not registered does not mean knowing where the data concerning the copier can be obtained. In this embodiment, however, which maintenance company the unregistered copier belongs to and what ID number it has can be known readily, and therefore it is easier to obtain the data concerning the unregistered copier. Moreover, unregistered copiers can be readily recognized on the list of unregistered copiers, and, when the registration procedure is completed, the registered entry is erased from the list of unregistered copiers. As a result, constant attention needs to be paid only to unregistered copiers.

In the above described copier management system, in which the communication control devices Y1 to Y7 originate a call so that data concerning the copiers is collected, it is essential that the host computers P1, P2, Q1, and Q2 of the maintenance companies A and B and of the lease companies C and D can smoothly receive data at any time. To achieve this, different transmission times need to be allocated to different devices Y1 to Y7 in advance, to prevent conflict of transmission times among the devices Y1 to Y7 under contract.

Figure 8:
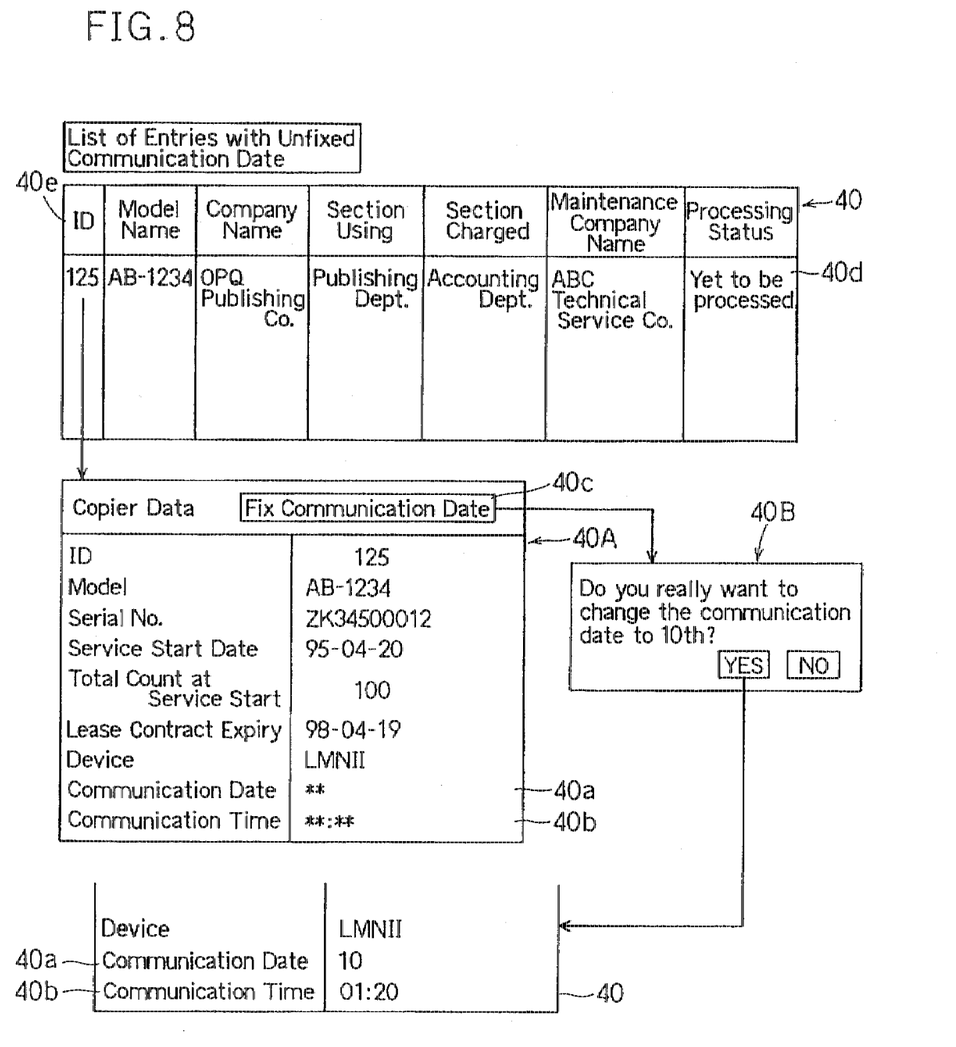
FIG. 8 is a diagram showing a list of entries with unfixed communication date.
Figure 9:
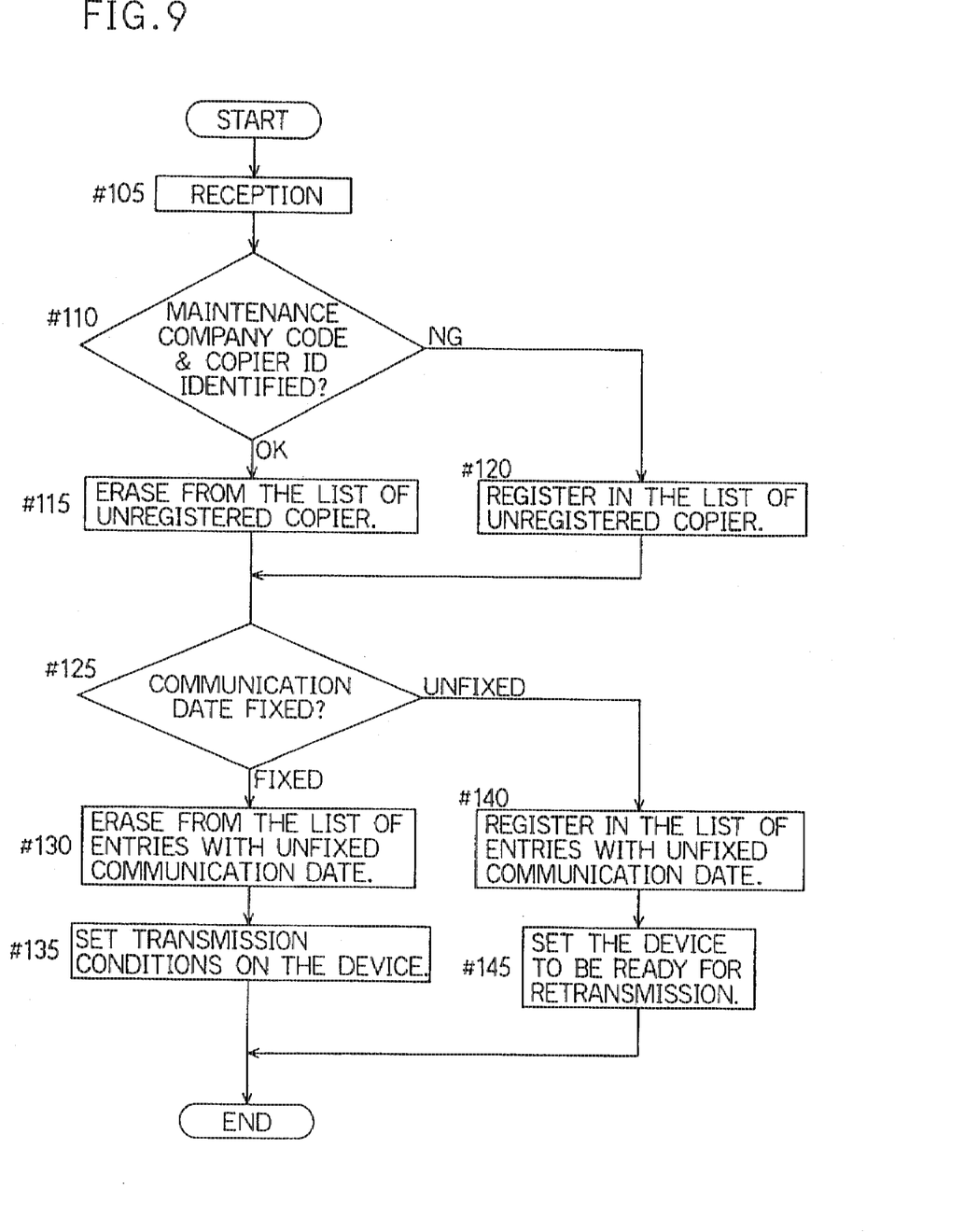
FIG. 9 is a flowchart showing a procedure for fixing a communication date on the host computer of the lease company.

In this case, the device Y1 is set to be ready for communication with the lease company in the initialization, so that the device Y1 communicates every day, starting on that day, until a transmission date is fixed. FIG. 8 shows a list of entries with unfixed communication date 40 serving as a managed equipment list display means in the host computer Q1 at the lease company C. FIG. 9 is a flowchart showing the operation of the CPU 31 in that host computer Q1. As shown in FIG. 9, the CPU 31 first receives a periodical report from the device Y1, in step #105, then displays, just as described earlier, an indication as to whether the data concerning the copier X1 has already been registered or not on the list of unregistered copier 39, in steps #110 and #120, and erases an entry when it has been registered.

Then, the data of the copier is registered, in step #115, and, if a date of transmission from the device Y1 to the host computer Q1 has not been fixed, in step #125, the procedure, judging that transmission date is unfixed, proceeds to step #140. There, on a list of entries with unfixed communication date 40 as shown in FIG. 8, the ID number and model name of the copier X1, the company name as the user name, the section where the copier is installed, the section to be charged, and the maintenance company name are displayed together with the status of processing. Note that the list of entries with unfixed communication date 40 is stored in the external storage unit 37, and, by clicking on the copier ID field 40a, the copier data screen appears.

Simultaneously, in step #145, the device Y1 is set to be ready for daily retransmission. In order to set retransmission, just as described earlier, the transmission date is rewritten so that transmission takes place at the specified time on the next day, or the flag for daily transmission is set to ON. In this way, the device repeats transmission every day, until a communication date for copier X1 is fixed.

Here, by clicking the copier ID field 40e on the list of entries with unfixed communication date 40, a copier data screen 40A as shown in FIG. 8 appears. On this copier data screen 40A, asterisks appear in the communication date field 40a and in the communication time field 40b for an entry whose transmission date is not fixed. In the case of the device Y1 of the copier X1, since the transmission date for it is unfixed, asterisks are displayed in the communication date field 40a. When the "Fix Communication Date" button 40c on this screen is pressed, a communication date change fixing box 40B appears, where a communication date can be fixed.

For the copier X1 whose communication date has been fixed, the indication in the processing status field 40d on the list of entries with unfixed communication date changes from "yet to be processed" to "under processing", and, when the communication date of the device is fixed during the next communication session, the data concerning the copier X1 is erased from the list of entries with unfixed communication date 40, in step #130.

By this process, the communication date of the device Y1 of the copier X1 is also fixed, in step #135, with the result that the device Y1 ceases to communicate every day. Since the communication performed by the device Y1 while it transmits data every day is not regular communication, data transmitted during that time is transferred only to the host computer Q1 at the lease company C, not to the host computer P1 at the maintenance company A. Note that, normally, when data is transmitted to the lease company C, the same data is transmitted also to the maintenance company A, in order to confirm charging data. Nevertheless, data such as a serviceperson call that is concerned exclusively with maintenance is transmitted to the maintenance company, irrespective of the communication date fixed by the lease company.

As described above, in this embodiment, when transmission is received from a communications control device of a copier, and if the communication date of that device has not been fixed, the ID number of the copier and the code of the maintenance company that have been transmitted from that device are displayed on a list of entries with unfixed communication date together with an indication indicating unfixedness of transmission date, and, until the communication date of a copier listed on the list of entries with unfixed communication date is fixed the device of that copier is made to transmit periodically. Moreover, when the communication date has been fixed, the indication indicating unfixedness of communication date is changed to an indication indicating fixedness of communication date. As a result communication dates can be fixed without fail, so that a lease contract can be fulfilled without fail.

In practice, it will be easier to recognize the processing status, if it is distinguished between the following three states: where a communication date is unfixed, where the date fixing process has been completed by the second computer, and where a date has been set on the device. Furthermore, it is possible to fix a communication date and set it on a device within as few as one day, without a need to wait for a long time.

Obviously, many modifications and variations of the present invention are possible in light of the above teachings. It is therefore to be understood that within the scope of the appended claims, the invention may be practiced other than as specifically described.

What is claimed is:

1. An equipment management system, comprising:

terminal devices attached to managed pieces of equipment for transmitting equipment management data with which those pieces of equipment are managed;

a first host computer linked with one group of terminal devices through a communications network for collectively managing that one group of terminal devices in terms of specific items of management data; and a second host computer linked with another group of terminal devices including at least part of said one group of terminal devices for collectively managing that other group of terminal devices in terms of other items than said specific items of management data, wherein the terminal devices, the first host computer, and the second host computer are linked through a network;

wherein the first host computer sets initial data including a symbol for identifying the managed piece of equipment on each terminal device;

wherein, out of said initial data, a necessary data including said symbol is registered in the second host computer, so that the second host computer can cope with any of the terminal devices; and wherein said second host computer comprises:

a managed equipment list display means which, on receiving transmission from a terminal device while an item concerning a piece of equipment corresponding to that terminal device has not been processed in the second host computer, displays said symbol transmitted from the terminal device on a managed equipment list together with an indication indicating lack of the item, and which, when said item has been processed, changes the indication indicating lack of the item to an indication indicating completion of processing of the item; and an instruction signal generating means which instructs the terminal device of the piece of equipment appearing on the list displayed on the managed equipment list display means to keep transmitting periodically until the item concerning the piece of equipment is processed, by transmitting an instruction signal to that terminal device during data reception from the terminal device.

2. An equipment management system as claimed in claim 1, wherein said managed equipment list display means, after answering a call from a terminal device of a managed piece of equipment whose item has been processed, erases data of that managed piece of equipment from said managed equipment list.

3. An equipment management system as claimed in claim 1, wherein said item concerning the managed equipment is a necessary data that is to be registered in the second host computer;

wherein the managed equipment list display means, on receiving transmission from the terminal device while the necessary data concerning the managed piece of equipment corresponding to that terminal device has not been registered in the second host computer, displays the symbol transmitted from the terminal device on the managed equipment list together with an indication indicating non-registration, and, when the necessary data has been registered in the second host computer, changes the indication indicating non-registration to an indication indicating completion of registration; and wherein the instruction signal generating means instructs the terminal device of the piece of equipment appearing on the list displayed on the managed equipment list display means to keep transmitting periodically until the necessary data concerning the piece of equipment is registered, by transmitting an instruction signal to that terminal device during data reception from the terminal device.

4. An equipment management system as claimed in claim 1, wherein said item concerning the managed equipment is a communication date that is to be fixed by the second host computer;

wherein the managed equipment list display means, on receiving transmission from the terminal device while the communication date for that terminal device has not been fixed, displays the symbol transmitted from the terminal device on the managed equipment list together with an indication indicating unfixedness of the communication date, and, when the communication date has been fixed, changes the indication indicating unfixedness of the communication date to an indication indicating fixedness of the communication date; and wherein the instruction signal generating means instructs the terminal device of the piece of equipment appearing on the list displayed on the managed equipment list display means to keep transmitting periodically until the communication date for the piece of equipment is fixed, by transmitting an instruction signal to that terminal device during data reception from the terminal device.

5. An equipment management system as claimed in claim 1, wherein terminal devices are each attached to an electronic photocopier to transmit data concerning how the electronic photocopier is used.

* * * * *